Patented Dec. 9, 1924.

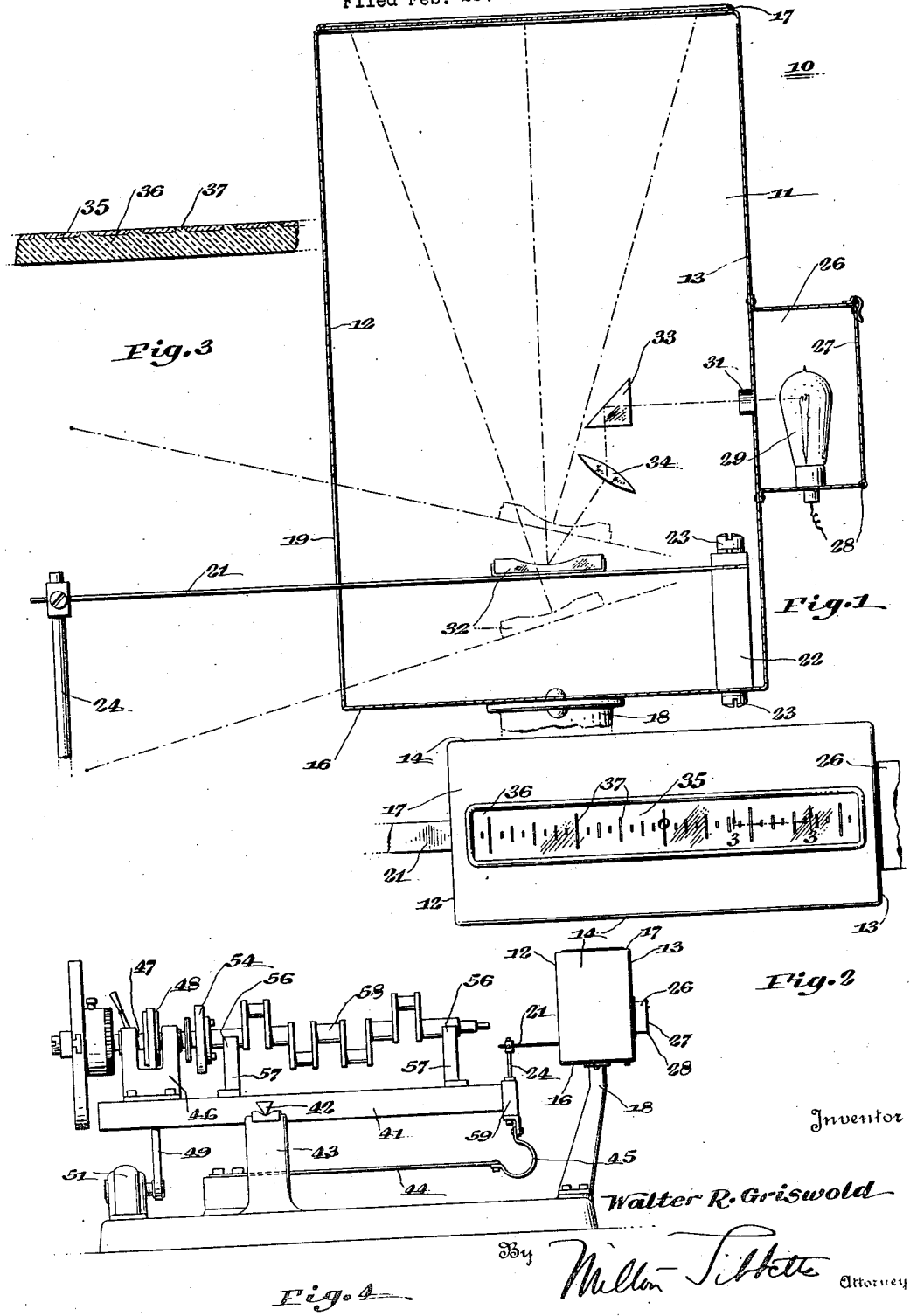

1,518,786

UNITED STATES PATENT OFFICE.

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN.

INDICATOR.

Application filed February 28, 1924. Serial No. 695,685.

*To all whom it may concern:*

Be it known that I, WALTER R. GRISWOLD, a citizen of the United States, and resident of Detroit, Wayne County, State of Michigan, have invented certain new and useful Improvements in Indicators, of which the following is a specification.

This invention relates to indicators and particularly to indicators of the optical type in which a beam of light is employed as the moving element.

In apparatus of this nature it is usual to place a suitable reflector on the member the movements of which are to be indicated. This reflector, in conjunction with other optical transmitting apparatus, is adapted to direct a beam of light onto a suitable scale, and the travel of the resulting spot of light on the scale is read to give a visual indication of the movement of the member.

In the use of such apparatus it is found that the ease or difficulty of obtaining accurate readings depends largely on the frequency of the movements of the beam of light. If the movements are reasonably slow, the eye is sufficiently quick to fix the limits of travel of the light spot on the scale and accurate readings may be had. If the frequency of travel of the beam is high enough so that the image of the light spot persists on the eye, the result is a continuous streak of light on the scale which is co-extensive with the amplitude of the swinging beam, and this is also easily read. Most of the difficulty arises between these extremes of frequency, where the beam travels at a rate too high for accurate notation on the scale and too low for persistence of vision.

One object of the invention is, therefore, to provide indicating apparatus of the character designated in which accurate readings may be quickly and easily made irrespective of the frequency of oscillation.

Other objects of the invention will appear from the following description taken in connection with the drawing, which forms a part of this specification, and in which:

Fig. 1 is a view in side elevation of indicating apparatus constructed in accordance with the invention, the housing being in vertical section;

Fig. 2 is a plan view of the top of the housing illustrated in Fig. 1, showing the scale in connection with the apparatus;

Fig. 3 is an enlarged section through a portion of the scale illustrated in Fig. 2, taken substantially on the line 3—3 of Fig. 2, and Fig. 4 is a view in side elevation illustrating the application of this invention to one type of machinery.

Indicators of the optical or light ray type are used in connection with numerous types of apparatus and machinery having a considerable range of operating frequencies. In many of these the frequency lies within the range previously mentioned, wherein this invention is particularly useful. It is to be understood that the invention is adaptable for use in connection with any type of machine or instrument. It has been illustrated, however, in connection with a machine for the balancing of rotating machine parts, which operates, for the most part, in that range of frequencies to which this invention is particularly applicable.

Referring to the drawing, at 10 is shown an indicator adapted to be mounted in a housing 11, which comprises front and rear walls 12 and 13, side walls 14, a bottom or floor 16, and a top 17. The floor 16 is mounted on a suitable pedestal 18 or other approprite means by which the device may be rigidly supported.

The front wall 12 of the housing 11 is provided with a vertically disposed slot 19 through which projects a slender, resilient indicating arm or lever 21, adapted to be oscillated with the movements of which an indication is desired. One end of the arm 21 is secured within the housing in any suitable manner, as by means of a pedestal 22 which may be secured to the arm and to the floor 16 by screws 23. The outer end of the lever 21 is connected, as by a link 24, to the member of which the movements are to be indicated.

Secured to the rear wall 13 of the housing 11 is an enclosure 26, which may be conveniently formed of pressed sheet metal and which has a rear wall 27 hinged as at 28 to provide access to the interior of the enclosure. Within this enclosure 26 is mounted any suitable source of light, as for example an incandescent electric lamp 29. The rear wall 13 of the housing 11 is also provided with an aperture 31, communicating with the enclosure 26, through which a beam of light from the source 29 may be introduced into the housing 11, preferably in a substantially horizontal direction.

Mounted on the lever 21 is a reflector 32 of any desired form, adapted to receive light from the source 29 through suitable transmitting devices. This reflector 32 is preferably a small concave mirror, as shown, adapted to reflect a convergent beam of light in the well known manner. The transmitting devices may be of any nature desired. As illustrated, they include a prism 33 by means of which the horizontal beam of light from the source 29 is bent vertically downward, and a collecting lens 34 adapted to receive the beam from the prism 33 and transmit it to the mirror 32. It will be evident that as the mirror 32 moves with the arm 21 through an angle corresponding to the oscillation of the moving member, the upwardly reflected beam of light from the mirror 32 will also travel through a corresponding angle.

The top 17 of the housing 11 is provided with an opening or slot in which is mounted a scale 36, in the plane of the beam of light from the reflector 32. This scale may be formed of any suitable material, but is preferably of light transmitting material such as glass, the surface of which has been treated to render it opaque, in such a manner as to intercept the light beam. The divisions 37 of the scale 36 are formed as small windows or light transmitting portions of the scale 37 and this structure may be conveniently manufactured by grinding or etching all that portion 35 of the upper surface of the scale 36 except the divisions 37 thereof.

It will be evident that this structure provides a scale having translucent windows 37 corresponding to the divisions thereof, these windows being located in an opaque or non-light transmitting surface, which is arranged in the plane of the beam of light reflected from the mirror 32. The distance from the mirror 32 to the scale 36 is preferably so regulated with respect to the concavity of the mirror 32 that the scale intercepts the convergent beam in the very narrow portion thereof. In this way the upwardly disposed beam of light, as it swings in response to movements of the mirror 32 lights up the translucent windows forming the divisions 37 of the scale, one at a time. Accordingly, an observer of the scale 36 sees the respective scale divisions 37 light up in succession as the beam of light travels across them and it is accordingly quite easy to pick out the last window which is lighted up before the return motion of the light beam starts, thus determining accurately the scale reading. Such determination of the scale reading is easily made regardless of the frequency of the oscillation of the swinging beam of light.

It will be understood that this invention is adapted for use in connection with any member having periodical movement of varying amplitude, an indication of which is desired. It is especially of use, however, in connection with machines used in the balancing of rotating parts, such as is illustrated in Fig. 4. Such a machine comprises a frame 41, pivotally mounted as at 42 on suitable supports 43, and yieldingly retained in its neutral or horizontal position by means of a flat cantilever spring 44 and a spring link 45 secured to one end thereof. The frame 41 carries a driving head 46 having a shaft 47 adapted to be driven in any convenient manner, as through a pulley 48 and a belt 49 from an electric motor 51, and suitable means (not shown) is provided for disengaging the drive when the shaft 47 has been brought up to any desired speed. The shaft 47 carries suitable means, such as the chuck 54, adapted to provide a resilient connection to the rotating part to be balanced, and the frame 41 is provided with a pair of spaced half bearings 56, mounted on suitable pedestals 57, in which the member is placed. This member is illustrated as an engine crank shaft 58.

The end of the frame 41 is provided with a fixture 59, by which it is connected to the link 24, and in this way the indicating arm 21 of the indicator 10 is actuated. The operation of this device is well understood. The shaft 58 is rotated above its critical speed by means of the shaft 47 and the chunk 54, and the shaft drive is then disengaged and the rotating parts allowed to slow down through the critical speed of the shaft. At the critical speed, oscillations of the frame 41 on its pivots 42 caused by unbalanced forces therein, are a maximum, and the amplitude of these oscillations is proportional to the amount of unbalancing force.

These oscillations are communicated through the link 24 to the arm 21, so that the upwardly disposed beam of light from the mirror 32 is oscillated through an angle which is also proportional to the unbalancing force, and this enables a reading to be taken by the observer on the scale 36.

It will be seen that the present invention provides means by which readings of oscillatory movement of variable amplitude may be readily taken in connection with apparatus such as that above described for the determination of unbalance in rotating machine parts, and that such readings may be taken more quickly and more accuratey than heretofore, especially within the range of frequencies therein encountered.

It will be understood that various forms of the invention other than those described above may be used without departing from the spirit or scope of the invention.

What is claimed is:

1. In combination in an indicator for measuring the amplitude of oscillation of a swinging member, a source of light fixed with respect to the member, a reflector carried by the member, means to transmit a beam of light from the fixed source to the reflector, and a scale adapted to intercept the reflected beam having transparent portions corresponding to the scale divisions.

2. The combination in an optical indicating mechanism for swinging members, of a fixed source of light, a reflector carried by the member adapted to reflect a beam of light from said source, and an opaque scale adapted to intercept the reflected beam having translucent windows corresponding to the scale divisions.

3. The combination in an indicating mechanism for moving members, of an oscillating beam of light adapted to swing through an arc proportional to the travel of said member, and an apaque scale intersecting the beam having translucent windows corresponding to the scale divisions.

4. The combination in an indicating mechanism for moving members, of a source of light, means carried by the member adapted to reflect a narrow beam of light from said source, and a scale having translucent divisions mounted in a plane of the reflected beam.

5. The combination in a device for measuring the oscillations of a vibrating member, of a source of light, a fixed scale having translucent windows forming the divisions thereof, and means adapted to swing a beam of light from the source through an arc proportional to the oscillations of said member in the plane of said windows.

6. The combination in a device for measuring the oscillations of a vibrating member, of a scale having divisions comprising light transmitting windows, means associated with the member to swing a beam of light through an arc proportional to the amplitude of vibration of the member, said beam swinging in the plane of the scale.

7. The combination in an indicating mechanism of a beam of light adapted to move through a variable angle, and a scale in the path of said beam having translucent scale divisions.

8. The combination in an indicating mechanism of a beam of light adapted to move through a variable angle, and a scale adapted to intercept said beam having light transmitting windows forming the divisons thereof.

9. The combination in an indicating mechanism of a beam of light adapted to move through a variable angle, and a scale mounted to intercept the beam having an opaque surface provided with translucent windows corresponding to the scale divisions.

10. The combination in an indicating mechanism of a scale of light transmitting material having an opaque surface strata, and scale divisions comprising translucent windows formed in said surface strata.

In testimony whereof I affix my signature.

WALTER R. GRISWOLD.